United States Patent [19]

Weigel

[11] 4,305,525

[45] Dec. 15, 1981

[54] METHOD AND ARRANGEMENT FOR DISPENSING SHEET MATERIAL

[75] Inventor: Peter Weigel, Borchen-Doerenhagen, Fed. Rep. of Germany

[73] Assignee: Nixdorf Computer AG, Paderborn, Fed. Rep. of Germany

[21] Appl. No.: 92,743

[22] Filed: Nov. 9, 1979

[30] Foreign Application Priority Data

Nov. 18, 1978 [DE] Fed. Rep. of Germany ....... 2850185

[51] Int. Cl.³ .......................................... B65H 59/00
[52] U.S. Cl. ..................................... 221/1; 221/231; 271/109
[58] Field of Search ................... 221/231, 21, 239, 13, 221/1; 271/109–127; 194/DIG. 26

[56] References Cited

U.S. PATENT DOCUMENTS

| 3,044,770 | 7/1962 | Breuers | 271/122 |
| 3,360,259 | 12/1967 | Stewart | 271/124 |
| 3,788,638 | 1/1974 | Lehmann | 271/109 X |
| 4,192,497 | 3/1980 | Perun et al. | 271/121 X |

FOREIGN PATENT DOCUMENTS 2717345 11/1978 Fed. Rep. of Germany ..... 133/4 A

Primary Examiner—F. J. Bartuska
Attorney, Agent, or Firm—Krass, Young & Schivley

[57] ABSTRACT

In a device for dispensing sheet material having at least one storage container for a stack of said sheet material, a withdrawal device associated with said storage container consisting of withdrawal rollers for removing sheets of said sheet material from said storage container, a plurality of spaced transporting rollers for conveying removed sheets along a path, spaced contra-rotating rollers which can be adjusted between said transporting rollers to obtain optimum detention of duplicate sheets thereby preventing the simultaneous passage of a plurality of sheets along said path and a dispensing station arranged at the end of the conveying path, the improvement comprising said contra-rotating rollers being formed of an inherently stable material, at least some of the transporting rollers being formed of an elastically yielding material preferably having a cellular or porous surface for good adhesion to said sheets, and at least some of the transporting rollers being formed of an inherently stable unyielding material to prevent a stack of said sheets from compressing said elastically yielding material and passing between said contra-rotating rollers and said elastic transporting rollers.

8 Claims, 2 Drawing Figures

4,305,525

METHOD AND ARRANGEMENT FOR DISPENSING SHEET MATERIAL

BACKGROUND OF THE INVENTION

The invention refers to a withdrawal or dispensing arrangement for sheet material, specifically a paper money dispenser, with at least one storage container for the stack-wise accommodation of the sheet material and a withdrawal device associated with the storage container wherein the withdrawal device consists of motor-driven transporting rollers arranged in the way of a drum-like roller mechanism forming a conveying path and of contra-rotating rollers which preferably can be dipped or inserted between the transporting rollers or roller sections which are arranged like the tines of a comb spaced from each other and a deposition or dispensing station arranged at the end of the conveying path.

In the case of known paper money dispensers, the withdrawal device consists of several motor-driven withdrawal rollers that slightly dip or penetrate into the storage containers which are partly open toward the side of withdrawal and which possess a surface exhibiting good adhesion to the paper money in the storage container. Also included is a combination of motor-driven transporting rollers and counter-pressure rollers. The transporting rollers as well as the counter-pressure rollers are mounted on bearing shafts which are parallel to one another and each of which possesses a multiplicity of roller sections at intervals to or spaced from one another which together yield a comb-like profile (sectional shape). With respect to the motor-driven transporting rollers, the counter-pressure rollers (which are likewise motor-driven, but in the opposite direction) are positioned in such a way that the roller sections or the individual counter-pressure rollers are capable of dipping or penetrating in an elastic (springy or resilient) manner into the gaps between the roller sections of the transporting rollers so that the possibility exists of adapting the dipping or penetrating depth and thereby varying the withdrawal forces applied to the different paper money qualities (denominations) or generally to obtain an optimum detention or hold-back action of the contra-rotating rollers. A very good transporting action, in regard to the transporting rollers, is obtained when the transporting rollers consist of an elastically yielding material which exhibits good adhesion in regard to the paper money. Tests have shown, however, that on trying to separate a plurality of undesired money bills having been simultaneously withdrawn from the storage container and which adhere to each other, errors can result. For instance, when 6 to 10 money bills adhere to each other, this stack of money bills is carried into the elastically yielding material of the transporting rollers and passes through the withdrawal and separation device without being separated from each other. Such an error occurs especially during the transportation of new, stiff "value bills", for instance paper money, firmly hanging together at the edge due to the cutting seam and which arrive in the transporting path and/or at the withdrawal and separation device in the form of a stack.

SUMMARY OF THE INVENTION

It is the task of the present invention to design a withdrawal arrangement of the type mentioned at the start of this description in such a way that a most extensive sheet separation effect can be achieved even under the most unfavorable conditions with respect to the nature and the stack formation of the sheet material.

According to the invention, this problem is solved due to the fact that the contra-rotating rollers consist of an inherently stable material and the greater part of the transporting rollers or roller sections consist of an elastically yielding material preferably having a cellular or porous surface with at least one of the transporting rollers or roller sections being made of an inherently stable, most thoroughly unyielding, material. In this way the sheets or money bills lying on top of one another in stack-wise fashion no longer can escape completely into the material of the elastically yielding transporting rollers by compressing the elastic material since this is prevented by the presence of at least one inherently stable transporting roller. In this process, the excellent adhesion function of the yielding transporting rollers is just as effective as before and promotes the withdrawal or transporting movement of the sheet material while the unwanted adhering sheets are prevented from being transported further by means of the contra-rotating roller. Tests have shown that in this manner an error-free separation of the sheets at the selected clearance between the transporting rollers and the contra-rotating rollers occurs even under the most unfavorable conditions.

Especially good separation properties are achieved when, according to an additional development of the invention, two of the inherently stable transporting rollers are arranged near the outer ends of a carrier roller mechanism mounted on a motor-driven bearing shaft and consisting of a plurality of transporting rollers or roller sections.

Thus, the invention is an improvement in a device for dispensing sheet material with at least one storage container for a stack of the sheet material, a withdrawal device associated with the storage container consisting of motor-driven transporting rollers arranged in the way of a roller mechanism and forming a conveying path contra-rotating rollers which preferably can be dipped between the transporting rollers arranged like the tines of a comb spaced from each other and a dispensing station arranged at the end of the conveying path, the improvement comprising contra-rotating rollers formed of an inherently stable material, at least some of the transporting rollers consisting of an elastically yielding material preferably having a cellular or porous surface and at least one of the transporting rollers made of an inherently stable, most thoroughly unyielding, material.

BRIEF DESCRIPTION OF THE DRAWINGS

For a more complete understanding of the present invention and for further objects and advantages thereof, reference is now made to the following description taken in conjunction with the accompanying drawings in which.

DESCRIPTION OF THE PREFERRED EMBODIMENT

Figure 1:
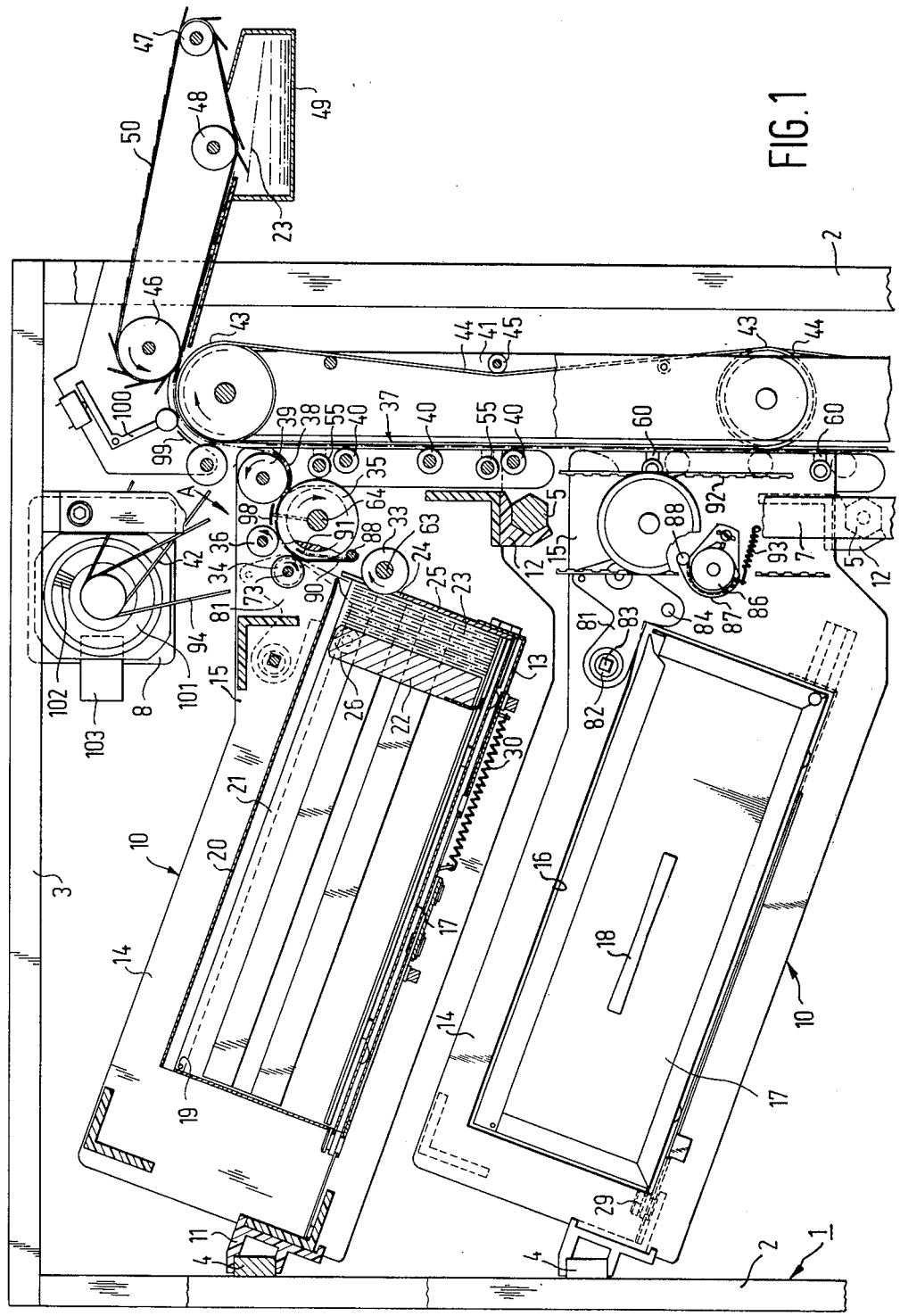
FIG. 1 shows the arrangement in a paper money dispenser according to the invention as a schematic sectional view.

In the sectional view according to FIG. 1, a support frame 1 is formed which carries the parts and structural components of the paper money dispenser which are described below. In the example of the preferred embodiment, this support frame 1 is made up of four vertical frame bars 2, as well as upper and lower horizontal crossbars 3 connecting frame bars 2 to one another. Frame 1, furthermore, possesses rear support traverses 4 fastened at intervals above one another to frame bars 2 and support traverses 5 designed with a hexagonal profile (cross-sectional shape) which are fastened to vertical support bars 7 of frame 1 (which are only partly shown in FIG. 1) in a manner vertically staggered with respect to support traverses 4. Numeral 8 designates a driving motor fastened to the upper boundary of frame 1. Storage components located at a short mutual distance above each other and generally designated by numeral 10 are mounted on support traverses 4 and 5 by means of shaped support rails 11 and 12. Each of the storage components 10 consists of a container frame 13 with carrier plates 14 fastened to both sides. Angular carrier sections 15 of these carrier plates 14 project or extend beyond container frame 13. In FIG. 1 it is indicated that one of the lateral carrier plates 14 possesses a rectangular opening 16 through which a storage cassette, generally designated by numeral 17 and equipped with a handle 18, can be pushed into the interior of container frame 13. Storage cassette 17 itself possesses a lid 20 which, to be placed in the open position, can be swung about center of rotation or pivot point 19. Guide rails 21 are also fastened to the side walls of the cassette. A flap-like press-on weight 22 which can freely be moved along guide rails 21 is mounted thereon. Stacks of paper money 23, for instance of money bills of different kinds of values (denominations), can be put into the storage cassettes 17 with a different denomination placed in each cassette. In doing so, due to the inclined arrangement of container frames 13 as well as of storage cassettes 17, the stack of paper money 23 is pushed against cassette wall 25 (which is provided with openings 24) by the force of gravity. This action is also promoted by press-on weight 22 which is mounted at its upper end in freely pivotal fashion in guide rails 21 by means of centrally located small rollers 26.

Paper money withdrawal devices are mounted on the carrier plates 15 of the individual storage components 10. These paper money withdrawal devices consist of withdrawal rollers 33, contra-rotating rollers 34, transporting rollers 35 and press-on rollers 36. Frames 37 can be fastened to carrier plates 15. These frames 37 are associated with the individual storage components 10 and, amongst other things, guide plates 38 and associated idling press-on rollers 39, as well as counter-press rollers 40 are mounted on frames 37. At the vertical front side of support frame 1, a frame 41 is fastened which carries belt idlers 43 which can be driven by drive motor 8 by means of drive belts 42 and endless elastic transporting conveyor belt 44. Furthermore, support frame 1 possesses carriers for drivable belt pulleys 46, 47 and 48 on which a conveyor belt 50 leading to a depositing or delivery station 49 is mounted. Conveyor belt 44 as well as conveyor belt 50 determine transporting or conveying paths which merge into one another and which serve for the collective transport of all money bills 23 taken from the individual storage components 10. The transporting path extending along and coupled to the withdrawal devices of the different storage containers or storage components can consist of several series-connected conveyor belts.

Figure 2:
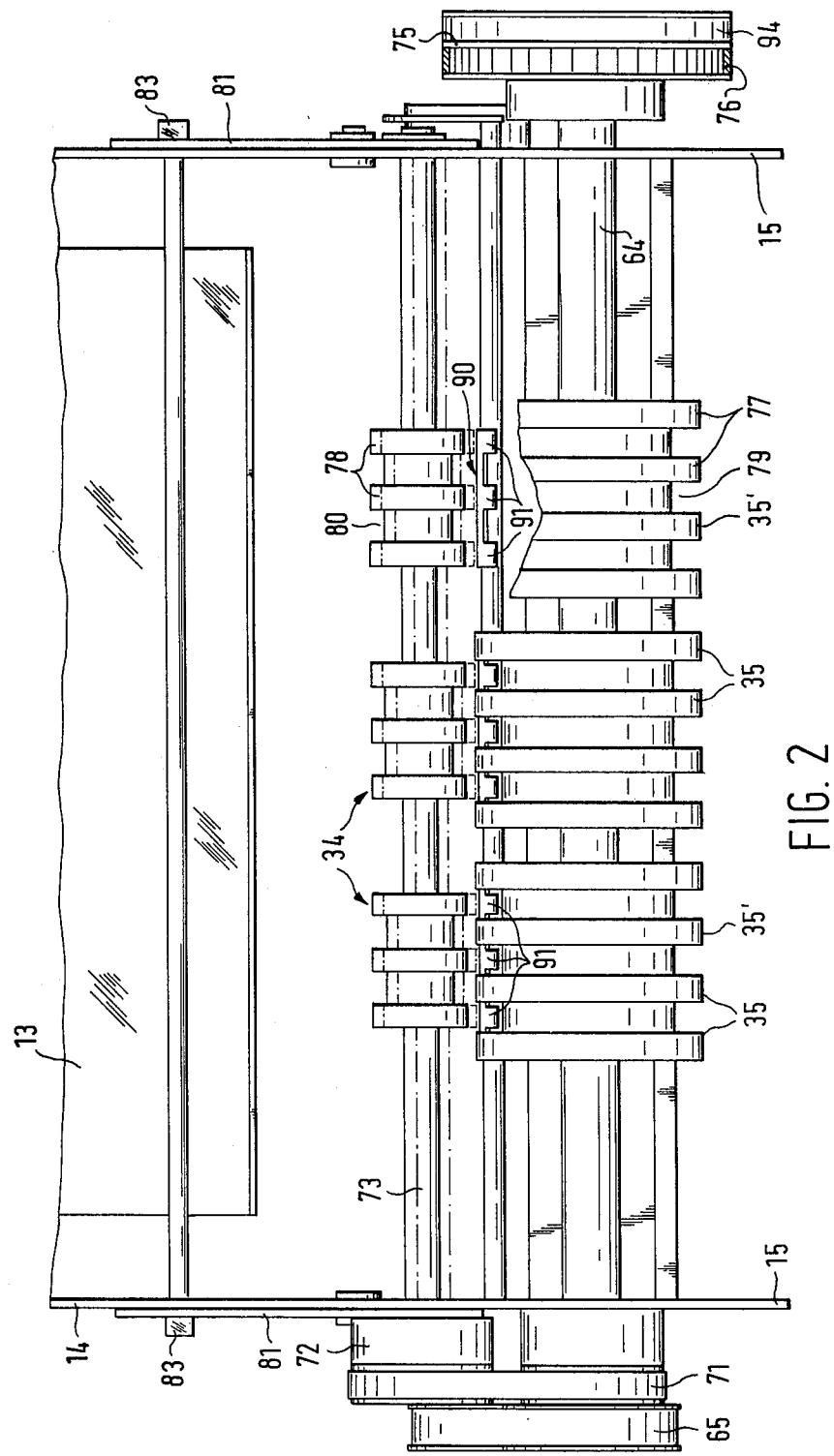
FIG. 2 shows a detail, on an enlarged scale, of the arrangement as a top view according to the direction of view A indicated in FIG. 1.

FIG. 2 shows the constructional design of the withdrawal device of a storage component 10. For the sake of clarity, the withdrawal rollers 33 shown in FIG. 1 which are mounted on the lateral carrier plates 14 within the region of carrier sections 15 have not been shown in FIG. 2. The bearing shaft 64 of transporting rollers 35 is coupled to the power input side of a electromagnetic coupling, capable of being activated electrically and known per se, via a belt drive 65 and corresponding belt pulleys. The power take-off side of the driving device is connected to bearing shaft 63 (shown in FIG. 1) of the withdrawal rollers 33 which, properly considered, are free-wheeling. Bearing shaft 64 of transporting rollers 35 likewise is in driving connection with bearing shaft 73 of contra-rotating rollers 34 via a belt drive 71 and, indirectly, via a speed-reducer drive 72. On the other side of the carrier plate(s) 14, bearing shaft 64 of transporting rollers 35 carries drive pulleys 75 for drive belt 92 (FIG. 1) which is connected to driving motor 8 as well as for drive belt 76 leading on to the next storage component 10. FIG. 2 clearly shows that transporting rollers 35, as well as contra-rotating rollers 34 possess a comb-like profile with rollers or roller sections 77 or 78, respectively, being arranged at an interval or spaced from each other, and with slots 79 and 80, respectively, lying therebetween wherein roller sections 78 are in alignment with slots 79. From the FIGS. it can be seen that contra-rotating rollers 34 and their bearing shaft 73 are mounted on mounting rocker arms 81 arranged on both sides of the container frame 13 of the storage component 10. These mounting rocker arms 81, on their part, are fastened to the carrier plates 15 via an eccentric drive 82 with square attachment 83 wherein by turning the square connection 83, the mounting rocker arms 81 can be readjusted about fulcrum 84 so that roller sections 78 of contra-rotating rollers 34 can dip or penetrate more or less deeply into slots 79 of transporting rollers 35. According to the invention, contra-rotating rollers 34 consist of an inherently stable material, preferably of a solid, sturdy polyurethane plastic having a Shore hardness of 92 to 95. With the exception of two transporting rollers or roller sections 35' arranged near the outer ends of the rollers on shaft 64, all other transporting rollers or roller sections 35 consist of an elastically yielding material preferably exhibiting or having a cellular or porous surface. For instance, such material may be formed of cellular polyurethane plastic having a material density in the order of magnitude of 0.55 g/$^3$.

The operating manner of the paper money dispenser which has been described will now be explained.

The drive units of the withdrawal device of the individual storage components 10 and the drive unit of conveyor belt or belts 44 and conveyor belts 50 are driven by the central driving motor 8 through means of drive belts 42 and 94. The paper money dispenser possesses a control device, not shown in detail, which is connected to the withdrawal devices or to the electromagnetic coupling of the individual storage components 10. For instance, by means of a keyboard well-known in the art, a certain definite dispensing program, i.e. a certain definite amount of "value bills" or paper money to be removed from the paper money dispenser can be entered into the control device. Via electronic devices also well-known in the art, the withdrawal devices of the storage components 10 individually associated with the individual money bill denominations are then controlled by the actuation of the electromagnetic couplings concerned. The result is that the bearing shafts 63 of the withdrawal rollers 33 which are concerned are coupled to the drive units so that the withdrawal rollers 33 turn in the direction of the arrow. Due to this rotation, the frontmost money bill 23 in any particular case is pulled out of the storage cassette 17 and carried to a conveying or transporting path determined by transporting rollers 35 or 35', contra-rotating rollers 34, and press-on rollers 38.

In this process, contra-rotating rollers 34, which turn relatively slowly counter to the direction of conveyance, prevent an erroneously conveyed duplicate bill from arriving between transporting rollers 35 and their press-on rollers 36 since contra-rotating rollers 34 retain or hold back such a duplicate bill. Due to the special construction of the transporting rollers and the contra-rotating rollers, a very good adhesion action between the paper money bill and the elastically yielding surfaces of the transporting rollers 35, 35' is secured on the one hand while, on the other hand, a stack of money bills erroneously made up of several money bills and unintentionally withdrawn from storage cassette 17 is prevented from being carried into the elastically yielding material of transporting rollers 35 by the contra-rotating rollers, and specifically such action is prevented by inherently stable transporting rollers 35' which do not yield and so prevent such a stack of money bills from compressing the elastic material of the other transporting rollers 35 and escaping as a stack between the transporting rollers 35, 35' and the contra-rotating rollers 34. In this manner, an error-free separation is achieved even under the most unfavorable conditions. At the level of transporting rollers 35 and 35', there is an alarm device 98, for instance in the form of a light barrier for detecting the pressure of multiple bills. As soon as the front end of the money bill reaches this alarm device 98, the latter is actuated. The alarm device 98, on its part, arrests the electromagnetic couplings as well as withdrawal rollers 33 and stops the machine. The correctly transported money bill, however, runs through the alarm device 98 and guide plate 38 and is transmitted to the central transporting or conveying path, i.e. to conveyor belt 44. From here, the orderly transported money bills are supplied by means of conveyor belt 50 to the depositing or dispensing station 49 or immediately to the client.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

I claim:

1. In a device for dispensing sheet material having at least one storage container for a stack of said sheet material, a withdrawal device associated with said storage container consisting of withdrawal rollers for removing sheets of said sheet material from said storage container, a plurality of spaced transporting rollers for conveying removed sheets along a path, spaced contra-rotating rollers which can be adjusted between said transporting rollers to obtain optimum detention of duplicate sheets thereby preventing the simultaneous passage of a plurality of sheets along said path and a dispensing station arranged at the end of the conveying path, the improvement comprising:
   a. said contra-rotating rollers being formed of an inherently stable material,
   b. at least some of the transporting rollers being formed of an elastically yielding material preferably having a cellular surface for good adhesion to said sheets,
   c. at least some of the transporting rollers being formed of an inherently stable unyielding material to prevent a stack of said sheets from compressing said elastically yielding material and passing between said contra-rotating rollers and said elastic transporting rollers, and
   d. a motor-driven bearing shaft carrying both said yielding and unyielding material rollers, at least two of the inherently stable unyielding rollers being located near respective opposite ends of said shaft.

2. A device as in claim 1 further comprising said elastically yielding transporting rollers being formed of soft plastic preferably of cellular polyurethane having a material density in the order of magnitude of 0.55 g/m³.

3. A device as in claim 2 wherein said contra-rotating rollers and said inherently stable transporting rollers are formed of a solid material preferably of polyurethane having a Shore hardness of 92 to 95.

4. A device as in claim 1 wherein said sheet material is paper money.

5. In a method of dispensing sheet material from a storage container comprising the steps of removing individual sheets of said material from said container with withdrawal rollers, transporting said removed sheets along a path with spaced transporting rollers, adjusting spaced contra-rotating rollers between said transporting rollers to obtain optimum detention of duplicate sheets and collecting said transported sheets at a dispensing station at the end of said path, the improvement comprising the steps of:
   a. forming said contra-rotating rollers of an inherently stable material,
   b. forming at least some of said transporting rollers of an elastically yielding material preferably having a cellular surface for good adhesion to said sheets,
   c. forming at least some of said transporting rollers of an inherently stable unyielding material to prevent a stack of said sheets from compressing said elastically yielding material and passing between said contra-rotating rollers and said elastic transporting rollers, and
   d. locating both of said yielding and unyielding material rollers on a common motor-driven shaft engaging said sheets.

6. A method as in claim 5 further comprising the step of forming said elastically yielding transporting rollers of soft plastic preferably of cellular polyurethane having a material density in the order of magnitude of 0.55 g/cm³.

7. A method as in claim 6 further including the step of forming said contra-rotating rollers and said inherently stable transporting rollers of solid material preferably of polyurethane having a Shore hardness of 92 to 95.

8. A method as in claim 5 further including the step of utilizing paper money as said sheet material.

* * * * *